United States Patent Office 3,801,626
Patented Apr. 2, 1974

3,801,626
PROCESS FOR THE PRODUCTION OF
DICHLOROACETOXYPROPANE
Johann Grolig and Gerhard Scharfe, Leverkusen, and Wolfgang Swodenk, Odenthal-Globusch, Germany, assignors to Bayer Aktiengesellschaft, Leverkusen, Germany
No Drawing. Filed Apr. 13, 1972, Ser. No. 243,870
Claims priority, application Germany, Apr. 30, 1971,
P 21 21 251.1
Int. Cl. C07c 67/00
U.S. Cl. 260—491    24 Claims

ABSTRACT OF THE DISCLOSURE

Dichloroacetoxypropane is produced by reacting allyl acetate with chlorine in the liquid phase in the contacting presence of a catalyst containing at least one halide of a metal of Groups I–B, VII–B and VIII of the Periodic Table.

---

This invention relates to a process for the production of dichloroacetoxypropane. More specifically, the instant process involves the chlorination of allyl acetate with molecular chlorine in the liquid phase in the presence of a catalyst containing a halide of a transition metal.

It is known that dichlorohydroxypropane can be prepared by the chemical addition of hypochlorus acid to allyl chloride (cf. U.S. Pat. 1,594,879). Dichloroacetoxypropane can be obtained from dichlorohydroxypropane by esterification with acetic acid anhydride in the usual way (cf. Comptes Rendus Hebdomadaires des Seances de l'Academie des Sciences, 139, page 868 (1904) and Berichte der Deutschen Chemischen Gesellschaft 24, 3466, in particular 3470 (1891)).

It has now been found that dichloroacetoxypropane can be produced in a technically advantageous manner by the process of this invention.

Essentially, the novel process comprises reacting allyl acetate with chlorine in the liquid phase in the presence of a catalyst containing a halide of a metal of the Ist, VIIth or VIIIth Secondary Group of the Periodic Table.

For example, the chlorides, bromides, iodides or fluorides of silver, copper, manganese, iron, cobalt, nickel, palladium, ruthenium, rhodium or platinum, can be used as catalysts.

The metal halide is advantageously used on a support such as silica, aluminium oxide, an aluminium silicate, titanium dioxide, a spinel or active carbon.

Preferred transition metal halides include the chlorides of Ist, VIIth and VIIIth Secondary Group of the Periodic Table for example silver chloride, copper (II) chloride, manganese (II) chloride, iron (II) chloride, iron (III) chloride, cobalt (II) chloride, nickel (II) chloride, palladium chloride, ruthenium chloride, rhodium chloride, platinum chloride or hexachloroplatinic acid.

It can be advantageous to impregnate the support with the metal halide before the reaction. For example, the support can be impregnated with a solution of the metal chloride in a suitable solvent such as water, hydrochloric acid, an alcohol or a carboxylic acid, followed by drying. For example, the finely powdered support may be treated with a solution of metal chloride in a rotary evaporator at 20 to 100° C. and the solvent subsequently distilled off under reduced pressure. The moist catalyst can be dried in a vacuum drying cabinet over a period of 6 to 24 hours at 50 to 150° C./100–300 mm. Hg. In this way it is possible to obtain an anhydrous active chlorination catalyst with a high selectivity for the conversion of allyl acetate into dichloroacetoxypropane.

The catalysts used in accordance with the invention can have a metal halide content of between 0.1 and 50% by weight. It is preferred to use catalysts with a metal halide content of between 1 and 20% by weight. It is advantageous to use the catalyst in fine-grained form, for example with a grain size of between 1 and 50μ. Suitable quantities of catalysts are, for example, between 3 and 30% by weight, based on the liquid reaction mixture as a whole.

It is advantageous to add an inert diluent to the allyl acetate. Suitable inert diluents include compounds which are unaffected by chlorine under the reaction conditions used. Chlorinated hydrocarbons such as methylene chloride, chloroform, carbon tetrachloride, dichloroethane and dichloropropane, are particularly suitable for use as diluents. Carbon tetrachloride is a particularly preferred diluent. The diluent is preferably added in a concentration of at least 50% by weight, based on the mixture of allyl acetate and diluent. It can be advantageous to use diluent concentrations of greater than 70% by weight. The diluent can even be present in a concentration of up to 90% by weight.

Chlorination can be carried out at a temperature between −30° and +150° C., although it is preferably carried out at a temperature between 0 and 100° C. Suitable temperatures are, for example between 10 and 60° C. Chlorination can be carried out at normal pressure, although it can also be carried out at reduced pressure or at elevated pressure. When the catalysts according to the invention are used, chlorination takes place extremely fast so that, with sufficient cooling to dissipate the heat of the reaction, the reaction may be over in a matter of minutes. With reaction times of from 3 minutes to 3 hours, substantially the same selectivities and yields of dichloroacetoxypropane are obtained. It is possible to use less than 1 mol of chlorine, based on 1 mol of the allyl acetate used, i.e. to work with a stoichiometric deficiency of chlorine, for example, with 0.1 mol of chlorine per mol of allyl acetate. In this case, the unreacted allyl acetate can be recovered by distillation and returned to the reaction. It is also possible to work with an excess of chlorine, based on the stoichiometrically necessary quantity, for example, with 2 mols of chlorine per mol of allyl acetate. In one preferred embodiment, a substantially stoichiometric quantity of chlorine is used so that the allyl acetate is reacted substantially quantitatively.

The quantity of chlorine required is introduced, for example, through a nozzle a frit or a gasification stirrer so that the gaseous chlorine is introduced into the liquid phase finely dispersed. It is also possible for the chlorine to be dissolved in some of the diluent and for this chlorine solution to be subsequently reacted with a solution of allyl acetate in the presence of a catalyst as aforementioned.

The chlorination of allyl acetate into dichloroacetoxypropane in accordance with the invention can be carried out as a batch process or in a continuous cycle. Batch chlorination can be carried out in a vessel which is equipped with a stirring mechanism, which contains allyl acetate, diluent and catalyst and into which the chlorine is introduced. The heat of reaction can be dissipated by built-in cooling means, for example by cooling coils, or by the boiling diluent, for example carbon tetrachloride. The reaction mixture can be run off from the vessel and, following mechanical separation of the catalyst, for example by filtration or by centrifuging, can be separated by distillation into low-boiling fractions, diluent, unreacted allyl acetate, if any, dichloroacetoxypropane and relatively high-boiling reaction products. The diluents is returned to the reaction together with any unreacted allyl acetate, the recovered catalyst and fresh allyl acetate.

The dichloroacetoxypropane obtained consists of two isomers, namely 2,3 - dichloro-1-acetoxypropane as the main product and 1,3-dichloro-2-acetoxypropane as the secondary product. The mixture of the dichloroacetoxypropane can be used as such for further chemical reactions, although it is also possible to separate the isomers by fractional distillation, which gives the lower-boiling 1,3-dichloro-2-acetoxypropane as the head product and 2,3-dichloro-1-acetoxypropane as the sump product. The 2,3-dichloro-1-acetoxypropane can be converted into 1,3-dichloro-2-acetoxypropane by isomerization at elevated temperature.

The continuous production of dichloroacetoxypropane can be carried out for example by using a vessel cascade and passing chlorine, allyl acetate, diluent and catalyst together through the vesels at such a rate that, after the last vessel, all the chlorine and almost all the allyl acetate have reacted. However, it is also possible for the chlorine to be introduced separately into the individual vessels. It is also possible for the liquid phase to be pumped around in a circulation reactor under continuous introduction of chlorine at one point of the reactor. After completion of the reaction, the catalyst can be mechanically separated off and reused.

Dichloroacetoxypropane can be used as an additive for drilling liquids. See, e.g., U.S. Pat. 2,815,323.

EXAMPLE 1

(a) 45 g. of finely ground $Al_2O_3$ with a grain size of between 5 and $50\mu$, a specific surface of 260–280 m.$^2$ g., a pore radius of between 40 and 5° A. and a porosity of 0.6 m.$^2$/g., were impregnated in a rotary evaporator with a solution of 5 g. of anhydrous $CoCl_2$ in 80 ml. of absolute methanol and the solvent distilled off at 60° C./100 torr. The moist catalyst was dried in a vacuum drying cabinet for 12 hours at 90° C./250 mm. Hg.

(b) A solution of 40 g. of allyl acetate in 160 g. of carbon tetrachloride (corresponding to 80% by weight of carbon tetrachloride) and 20 g. of the finely divided catalyst produced as described in (a) were introduced into a 500 ml. three-necked flask equipped with a gasification stirrer. Gaseous chlorine was then introduced with vigorous stirring. Thhe reaction temperature was adjusted by cooling to 20° C. After 4 to 10 minutes, chlorine ceases to be absorbed and the reaction was complete. The reaction mixturue was analyzed by gas chromatography and separated into individual fractions by fractional distillation. Conversion of the allyl acetate was quantitative. The yield of dichloroacetoxypropane was 84.7 mol percent.

EXAMPLE 2

(a) Finely ground active carbon "Carboraffin C" (registered trademark of Farbenfabriken Bayer AG) was impregnated with vigorous stirring in a 1 liter glass beaker equipped with a magnetic stirrer with a solution of an anhydrous metal chloride, as listed in Table 1, in 200 ml. of distilled water, the entire solution being absorbed by the active carbon. Depending upon the percent by weight of metal chloride required in the active carbon (10, 5 and 1% by weight, cf. Table 1), 10, 5 and 1 g. of the metal chloride were used for 90, 95 and 99 g., respectively, of the active carbon. The moist catalyst was dried in a vacuum drying cabinet for 12 hours at 100° C./250 mm. Hg.

(b) Batches of 20 g. of the catalyst thus prepared were used for chlorination as described in Example 1(b). The yields of dichloroacetoxypropane thus obtained are set out in Table 1.

TABLE 1

| Catalyst (active carbon): | Yield of dichloroacetoxypropane in mol percent |
|---|---|
| +5% by weight of $CuCl_2$ | 93.7 |
| +10% by weight of $CuCl_2$ | 93.3 |
| +5% by weight of $MnCl_2$ | 96.0 |
| +10% by weight of $MnCl_2$ | 96.0 |
| +5% by weight of $FeCl_3$ | 85.0 |
| +1% by weight of $CoCl_2$ | 93.7 |
| +5% by weight of $CoCl_2$ | 97.4 |
| +10% by weight of $CoCl_2$ | 96.1 |
| +5% by weight of $NiCl_2$ | 93.0 |
| +10% by weight of $NiCl_2$ | 95.2 |
| +5% by weight of $PdCl_2$ | 93.1 |
| +10% by weight of $PdCl_2$ | 89.8 |

EXAMPLE 3

A supported catalyst was prepared as in Example 2(a) from 5% by weight of $MnCl_2$ on active carbon "Carboraffin" (Registered trademark of Farbenfabriken Bayer AG). 20 g. of this catalyst were used for the chlorination of allyl acetate under the conditions described in Example 1(b). Following the reaction of 40 g. of allyl acetate, the catalyst was recovered by filtration and used for reaction of a further 40 g. of allyl acetate in order to determine the dependence of the yield of dichloroacetoxypropane upon the service life of the catalyst. The respective yields obtained after the catalyst had been reused 8 times are set out in Table 2.

TABLE 2

| Number of reruns: | Yield of dichloroacetoxypropane (in mol percent) |
|---|---|
| 0 (fresh catalyst) | 95.5 |
| 1 | 92.3 |
| 2 | 94.7 |
| 3 | 95.7 |
| 4 | 93.0 |
| 5 | 92.0 |
| 6 | 92.0 |
| 7 | 92.2 |
| 8 | 92.5 |

It will be understood that the specification and examples are illustrative but not limitative of the present invention and that other embodiments within the spirit and scope of the invention will suggest themselves to those skilled in the art.

What is claimed is:

1. Process for the production of dichloroacetoxypropane, which process comprises reacting allyl acetate with chlorine in the liquid phase in the presence of a catalyst consisting essentially of a halide of a metal of Groups I–B, VII–B or VIII of the Periodic Table or mixtures thereof at a temperature of from −30° C. to 150° C.

2. Process as claimed in claim 1 wherein said halide is a chloride.

3. Process as claimed in claim 1 wherein said halide is a copper chloride.

4. Process as claimed in claim 3, wherein said copper chloride is cupric chloride.

5. Process as claimed in claim 1 wherein said halide is manganese (II) chloride.

6. Process as claimed in claim 1 wherein said halide is cobalt (II) chloride.

7. Process as claimed in claim 1 wherein said halide is nickel (II) chloride.

8. Process as claimed in claim 1 wherein said metal is copper, silver or gold.

9. Process as claimed in claim 1 wherein said metal is manganese.

10. Process as claimed in claim 1 wherein said metal is iron, ruthenium, cobalt, rhodium, nickel, palladium or platinum.

11. Process as claimed in claim 1 wherein two or more metal chlorides are used.

12. Process as claimed in claim 11 wherein said halides are of the same metal.

13. Process as claimed in claim 11 wherein said halides are of different metals.

14. Process as claimed in claim 1 wherein the reaction is carried out in the presence of at least 50% of an inert diluent, based on the mixture of allyl acetate and diluent.

15. Process as claimed in claim 14, in which the inert diluent is a chlorinated hydrocarbon.

16. Process as claimed in claim 14, in which the inert diluent is carbon tetrachloride.

17. Process as claimed in claim 1, in which said metal halide is on a support.

18. Process as claimed in claim 17, in which the support is silica, aluminum oxide, an aluminum silicate, titanium dioxide, a spinel or active carbon.

19. Process as claimed in claim 17 wherein the metal halide content of the catalyst is from 0.1 to 50% by weight, based on metal halide and support.

20. Process as claimed in claim 1 wherein the concentration of the catalyst is from 3 to 30% by weight, based on the total reaction mixture.

21. Process as claimed in claim 1, in which the grain size of the catalyst is from 1 to 50µ.

22. Process as claimed in claim 1, in which the reaction is carried out at a temperature of from 0° to 100° C.

23. Process as claimed in claim 22, in which the reaction is carried out at a temperature of from 10° to 60° C.

24. Process as claimed in claim 1, in which substantially stoichiometric quantities of allyl acetate and chlorine are provided for the reaction.

References Cited
UNITED STATES PATENTS
3,290,395   12/1966   Bohm et al. _____ 260—633

VIVIAN GARNER, Primary Examiner